US011295338B2

(12) United States Patent
 Stringham

(10) Patent No.: US 11,295,338 B2
(45) Date of Patent: Apr. 5, 2022

(54) DYNAMIC AFFILIATE MARKETING PLATFORM

(71) Applicant: Mark Stringham, Payson, UT (US)

(72) Inventor: Mark Stringham, Payson, UT (US)

( * ) Notice: Subject to any disclaimer, the term of this patent is extended or adjusted under 35 U.S.C. 154(b) by 2 days.

(21) Appl. No.: 16/709,781

(22) Filed: Dec. 10, 2019

(65) Prior Publication Data

US 2020/0184512 A1 Jun. 11, 2020

Related U.S. Application Data

(60) Provisional application No. 62/777,633, filed on Dec. 10, 2018.

(51) Int. Cl.
 *G06Q 30/02* (2012.01)
(52) U.S. Cl.
 CPC ..... *G06Q 30/0246* (2013.01); *G06Q 30/0276* (2013.01); *G06Q 30/0277* (2013.01)
(58) Field of Classification Search
 CPC ...................................................... G06Q 30/02
 See application file for complete search history.

(56) References Cited

U.S. PATENT DOCUMENTS

| | | | | |
|---|---|---|---|---|
| 7,467,098 | B2* | 12/2008 | Razumov | G06Q 10/0637 705/26.8 |
| 9,531,993 | B1* | 12/2016 | Wiseman | H04N 21/4722 |
| 10,007,945 | B2* | 6/2018 | Foerster | G06Q 30/0623 |
| 10,904,168 | B2* | 1/2021 | O'Driscoll | H04L 65/60 |
| 2009/0299861 | A1* | 12/2009 | Littlefield | G06Q 30/0277 705/14.73 |
| 2010/0115462 | A1* | 5/2010 | Spencer | G06F 16/48 715/800 |
| 2012/0005016 | A1* | 1/2012 | Graff | G06Q 30/0251 705/14.49 |

(Continued)

FOREIGN PATENT DOCUMENTS

| | | | |
|---|---|---|---|
| EP | 2831753 B1 | 10/2018 | |
| WO | WO 2001/037540 A2 * | 5/2001 | G06F 17/30 |

(Continued)

OTHER PUBLICATIONS

D.S.F. Wong; D.K.W. Chiu, Collaborative Workflow Management with Alerts: An Integrated Retailing System for Garments Brands (English), IEEE International Conference on e-Business Engineering (ICEBE'07) (pp. 433-438), May 5, 2007 (Year: 2007).*

(Continued)

*Primary Examiner* — Marilyn G Macasiano
(74) *Attorney, Agent, or Firm* — Loyal Intellectual Property Law, PLLC; Travis Banta

(57) ABSTRACT

Systems, methods, and devices for affiliate marketing. A method of the disclosure includes receiving affiliate product data from a merchant account. The method includes determining intelligence sources for generating an affiliate product for a promoter account and determining rules for generating the affiliate product for the promoter account. The method includes determining the affiliate product for the promoter account based on the intelligence sources, the rules, and the affiliate product data from the merchant account. The method includes tracking consumer click-throughs on the affiliate product provided to the promoter account.

20 Claims, 12 Drawing Sheets

(56) References Cited

U.S. PATENT DOCUMENTS

2012/0296718 A1* 11/2012 Kennedy ................ G06Q 30/06
                                                                         705/14.16
2017/0250930 A1* 8/2017 Ben-Itzhak ............. G06F 3/011
2018/0047048 A1* 2/2018 Mielechowicz ... G06Q 30/0243

FOREIGN PATENT DOCUMENTS

WO      2017166280 A1    10/2017
WO      2018214163 A1    11/2018

OTHER PUBLICATIONS

United States Patent and Trademark Office, "International Search Report", dated Mar. 3, 2020, International Application No. PCT/US19/65537.

* cited by examiner

DYNAMIC AFFILIATE MARKETING PLATFORM

PRIORITY CLAIMS

This application claims the benefit of U.S. Provisional Application No. 62/777,633, filed Dec. 10, 2018, which is incorporated herein by reference in its entirety, including but not limited to those portions that specifically appear hereinafter, the incorporation by reference being made with the following exception: In the event that any portion of the above-referenced provisional application is inconsistent with this application, this application supersedes said above-referenced provisional application.

TECHNICAL FIELD

The disclosure relates generally to systems, methods, and devices for integrated marking and particularly relates to systems, methods, and devices for dynamically updated affiliate marketing.

BACKGROUND

Significant time, resources, and efforts are expended by merchants and promoters of goods and services to market, brand, advertise, and sell products or services to consumers in regional and global markets. Internet-based commerce has grown in recent years and the number of consumer commercial transactions occurring over the Internet represents a significant portion of the commercial market. The Internet may also be used to facilitate merchants' ability to narrowly target potential consumers for commercial transactions. Merchants may customize advertisements and provide advertisements to selected users who are determined to be more likely to have an interest in the merchant's goods or services. Similarly, affiliate marketing permits a merchant or other promoter to provide a static text or image link to a visitor that permits the visitor to click through to a page approved by the promoter.

Methods, systems, and devices are herein disclosed for automated affiliate marketing platforms. Such methods, systems, and devices are directed to dynamically generating affiliate products to be provided to a promoter account. The promoter account may display an affiliate product on a website or other media platform and consumers may click-through to purchase or learn more about the affiliate product. A merchant that is associated with the affiliate product may be informed that a consumer clicked-through via the promoter's website or other media platform. Such methods, systems, and devices of the present disclosure provide dynamically updated affiliate products that are appropriate for a promoter's website or other media platform.

SUMMARY

Disclosed herein is a non-transitory computer readable storage medium containing instructions which when executed by a processor cause the processor to perform a method. The method may include determining, for a promoter account, one or more rules for selecting one or more products. The method may further include determining, for the promotor account, an intelligence source for selecting the one or more products. The method may further include receiving, from a merchant account, product information concerning the one or more products. The method may further include determining, for the promotor account, the one or more products based on the rules and the intelligence source. The method may further include determining, for the promotor account, where and when the one or more products should be displayed. The method may further include, tracking, for the promotor account, the one or more products display click-throughs of the product by a consumer.

Further disclosed herein is a system. The system includes a processor which executes an affiliate marketing platform. The processor may adjust an intelligence source for selecting an affiliate product. The processor may further receive information from a merchant processor which includes intelligence sources for determining appropriate affiliate product for a promotor. The processor may further determine the appropriate affiliate product for the promotor. The processor may further receive a count of consumer click-throughs on the affiliate product. The processor may further track consumer click-throughs on the one or more products provided to an account associated with the promotor.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
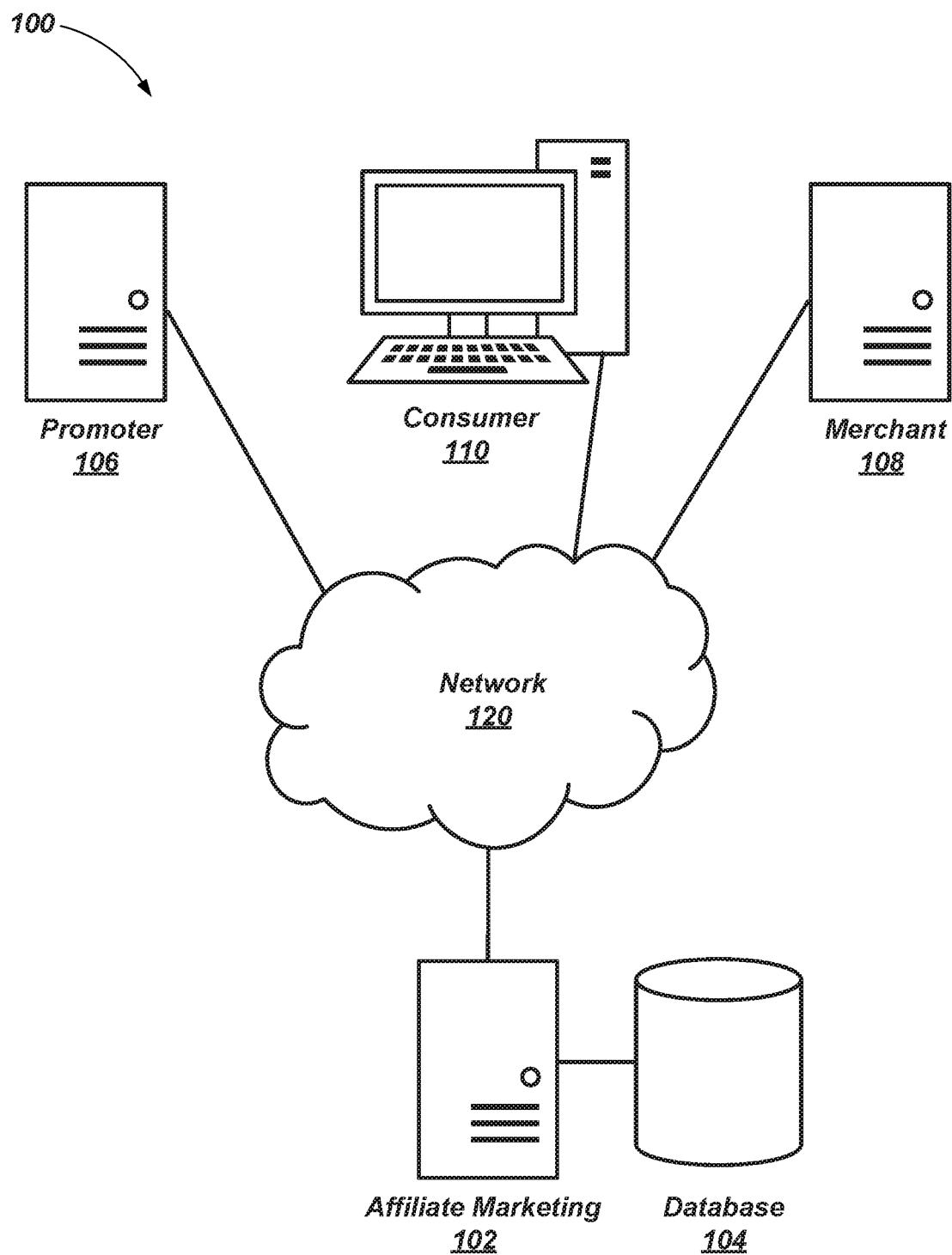
FIG. 1 illustrates a schematic diagram of a system for affiliate marketing that includes an affiliate marketing platform with an associated database.

The present disclosure extends to systems, methods, and devices for automated affiliate marketing. Marketing campaigns are an important aspect of a product or service provider's plan to provide and sell products to consumers. Such product and service providers may include manufacturers, brick-and-mortar retailers, online retailers, service providers, lenders, agents, and so forth that may operate in commerce to sell, lease, rent, advertise, or promote any good or service. Improvements in technology enable merchants to provide personalized marketing such that advertisements are provided only to those consumers that are more likely to be interested in the products. Such personalized marketing saves resources for those consumers who are more likely to make a purchase and is more cost-efficient than broad advertising methods.

Marketing efforts may be improved where marketing campaigns are tailored specifically to consumers who are more likely to be interested in the products. Additionally, marketing campaigns are more appreciated by consumers where the advertisements are not disruptive or irritating to the consumer. Affiliate marketing provides a performance-based marketing strategy that may be utilized to effectively market products to interested consumers. Affiliate marketing may reward affiliates for directing visitors or customers to a merchant or promoter. Merchants may favor affiliate marketing because it may provide a "pay for performance" model such that the merchant only incurs a marketing expense when results are accrued, such as a new visit to a merchant website, a complete purchase, and so forth. Affiliate marketing may take a variety of forms and may be incorporated into search engines, loyalty websites, personal websites, personal weblogs, shopping directors, videos, and so forth.

In an Internet-based environment, consumers are more likely to interact with advertisements on a website when the associated products are strongly tied to website content or messaging. For example, a consumer may be more likely to purchase a clothing product that is marketed by a fashion website or influencer that the consumer trusts. The affiliate marketing platform of the present disclosure utilizes intelligent product display rules to dynamically deploy relevant products based on defined content "intelligence sources." Such intelligence sources include, for example, content meta tags, product identifications, custom phrases, keywords, and so forth.

Influencers or promoters may wish to provide affiliate products to consumers through the promoter's website or other media platform. Such promoters may receive compensation for providing affiliate products on the promoter's website and may particularly receive compensation when a consumer clicks through the promoter's website to purchase or learn more about the affiliate product. However, it can be time consuming for promoters to determine quality affiliate products that are similar to the promoter's website content or messaging. Promoters can spend significant time determining appropriate products, providing links to the appropriate products, generating a connection with an affiliate merchant, and updating affiliate products to reflect changes in the marketplace. Methods, systems, and devices as disclosed herein provide dynamically updated affiliate products to be featured on a promoter's web site or other media content. The dynamically updated affiliate products are determined based on product display rules and intelligence sources. The promoter account may feature the dynamically updated affiliate products and automatically receive compensation for consumer click-throughs on the affiliate products. Such systems, methods, and devices of the present disclosure provide an effective and efficient means for promoters to determine appropriate affiliate products and receive compensation for promoting such products.

In an embodiment, a method for dynamically determining affiliate products is disclosed. The method includes receiving affiliate product data from a merchant account. The method includes determining intelligence sources for generating an affiliate product for a promoter account and determining rules for generating the affiliate product for the promoter account. The method includes determining the affiliate product for the promoter account based on the intelligence sources, the rules, and the affiliate product data from the merchant account. The method includes providing the affiliate product to the promoter account. The method includes tracking consumer click-throughs on the affiliate product provided to the promoter account.

Before the structure, systems, and methods for automated affiliate marketing are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

FIG. 1 illustrates a schematic diagram of a system 100 for affiliate marketing. In an embodiment, the system 100 includes an affiliate marketing platform 102 with an associated database 104. The database 104 is configured to store data relating to the affiliate marketing platform 102, including data received from other sources and data relating to rules, settings, and intelligence sources for determining appropriate affiliate products for a promoter 106. The affiliate marketing platform 102 is in communication with a promoter 106, a merchant 108, and a consumer 110 over a network 112.

The promoter 106 is an account associated with a promoter 106 user, such as an individual, a corporation, an organization, a political organization, and so forth. In various embodiments the promoter 106 may be associated with, for example, a search engine, a price comparison service or website, a loyalty website, a cause-related marketing website, a coupon or rebate website, a content website, a personal website or weblog, an email marketing list, a video sharing website, and so forth. The promoter 106 may provide hyperlinks or content directing consumers to certain products. The affiliate marketing platform 102 may automatically provide relevant products to the promoter 106 based on content provided by the promoter 106 or an expertise that is associated with the promoter 106.

The merchant 108 is an account associated with a merchant 108 user, such as a provider of goods, services, information, and so forth. In various embodiments the merchant 108 includes, for example, manufactures, providers of services, retailers, professionals, political organizations, nonprofit organizations, and so forth. The merchant 108 may provide products to the affiliate marketing platform 102 that the merchant 108 wishes to promote via an affiliate marketing program. In an embodiment, the merchant 108 is a retailer and all products provided by the retailer are eligible for the affiliate marketing program. The affiliate marketing platform 102 may provide a notification to the merchant 108 when a promoter 106 links to a merchant 108 product and/or provides a recommendation related to a merchant 108 product. Further, the affiliate marketing platform 102 may provide a notification to the merchant 108 when a consumer 110 interacts with a recommendation or link to a product that is provided by the promoter 106. In such an implementation, the affiliate marketing platform 102 may further provide a credit to the promoter 106 on behalf of the merchant 108.

The consumer 110 is an account associated with a consumer 110 user. In various embodiments the consumer 110 is a person, an organization, a business, and so forth. The consumer 110 may be any person or entity that interacts with a promoter 106 and views or clicks on information related to affiliate marketing products that are presented on the promoter's 106 website or other media platform. In an embodiment, the merchant 108 and/or the promoter 106 are in direct communication with the consumer 110 and click-throughs on an affiliate product are not funneled through the affiliate marketing platform 102 but are instead collected directly by the merchant 108 and/or the promoter 106.

The affiliate marketing platform 102 serves to provide relevant products to consumers 110 and provide an effective marketing platform for merchants 108. Such products include, for example, goods, services, organizations, political platforms, charity organizations, and so forth. Such merchants include, for example, manufacturers of goods, providers of services, retailers, nonprofit organizations, political organizations, charity organizations, and so forth. The affiliate marketing platform 102 dynamically deploys relevant affiliate products to promoters 106 in real-time based on intelligence sources and deployment rules.

The affiliate marketing platform 102 utilizes intelligent product display rules to dynamically deploy relevant products to promoters 106 based on defined content intelligence sources. Such intelligence sources include, for example, product metatags, content metatags, product identifications, custom phrases, keywords, consumer identification, promoter identification, and so forth. The affiliate marketing platform 102 provides a monetization opportunity to the promoter 106 by automatically providing relevant affiliate products to the promoter 106 in real-time. The promoter 106 may generate a website or other media and the affiliate marketing platform 102 will automatically deploy relevant affiliate products that may be presented on the website or other media. The promoter 106 may elect to incorporate such affiliate products into the website or other media content, the promoter 106 may accept certain products and deny other products, and the promoter 106 may set rules defining which affiliate products the promoter 106 will accept. A hyperlink or other association may be provided in the promoter's 106 content that directs a consumer 110 to the affiliate product. The promoter 106 may receive a credit from a merchant 108 associated with the affiliate product if a consumer 110 clicks through to view or purchase the affiliate product.

The affiliate marketing platform 102 generates and provides a novel form of automated affiliate marketing to a promoter 106. In an embodiment, the affiliate marketing platform 102 receives product content from a merchant 108 or affiliate marketing network. In an embodiment, the affiliate marketing platform 102 receives such product content by syncing with an affiliate account that the promoter 106 has previously established with the merchant 108. The affiliate marketing platform 102 may provide such product content to the promoter 106 and may automatically provide personalized product content that is relevant to the promoter 106. The affiliate marketing platform 102 may receive an indication from a consumer 110 that the consumer interacted with the affiliate product content via the promoter's 106 website or other media content. The affiliate marketing platform 102 may provide a notification to the merchant 108 that the consumer 110 interacted with the affiliate product content via the promoter 106. In an embodiment, the promoter 106 may receive a credit from the merchant 108 for generating a consumer 110 interaction with the affiliate product content. The credit may include monetary compensation or any other suitable credit.

In an embodiment, the affiliate marketing platform 102 generates a "product block" to be displayed on the promoter's 106 website or other media platform. The product block may be located in a predetermined location on a website and may be automatically updated with varying affiliate products. The affiliate marketing platform 102 may determine appropriate affiliate products to display within the product block based on intelligence sources derived from the promoter's 106 website or from settings input by the promoter 106. Additionally, the promoter 106 may have control over the aesthetics of the product block and the various affiliate products that are displayed within the product block. The promoter 106 may additionally assign a particular product block to a particular merchant 108, or may enable the product block to be associated with different merchants 108 at different times.

The affiliate marketing platform 102 may generate affiliate products based on information provided in a product block intelligence source. Example intelligence sources include, for example, post title, post meta tags, product ASIN, text string, specific keywords, and so forth. The post title refers to a title of a specific page or specific content within the promoter's 106 website or other media content. In an example where the promoter 106 operates a personal weblog, the post title refers to a title of a blog post within the personal weblog. The post meta tags refer to meta tags assigned to a post within, for example, a blog post for a personal weblog. Such post meta tags may be customized and determined by the promoter 106.

The affiliate product content may be provided to the consumer 110 on any suitable platform. Such platforms include websites, movies and/or television that may include product placements, media subscription services such as Netflix™ or Hulu™, cable subscription services, and so forth. Additionally, product content may be provided through social media where consumers may interact with other persons, view images or videos, and engage directly with promoters 106.

The affiliate products may be presented on the promoter's website or other media platform by way of a "product block." The product block may include a dedicated space within the website where affiliate products will be featured. The affiliate products are dynamically updated according to the content of the website, the content of a specific page within the website, the currently available affiliate products, meta tags on the website, and so forth. The promoter 106 may have control over stylistic features of the product block, including where the product block is located on the website, the aesthetic characteristics of the product block, how many affiliate products may be featured in the product block, and so forth.

The affiliate marketing platform 102 is configured to automatically monitor click-throughs on affiliate products. In an example, a promoter 106 is a product recommendation website and publishes a post that recommends several affiliate products. The affiliate products are automatically recommended by the affiliate marketing platform 102, and the affiliate marketing platform 102 further provides appropriate hyperlinks for each of the several affiliate products. In such an example, the affiliate marketing platform 102 automatically monitors when a consumer 110 clicks through on one of the appropriate hyperlinks. The affiliate marketing platform 102 monitors click-through success and provides such information to the promoter 106 and appropriate merchant 108.

The promoter 106 may provide indications to the affiliate marketing platform 102 of which types of products the promoter 106 wishes to feature on a website or other media content. The promoter 106 may provide key words or phrases to the affiliate marketing platform 102 that indicate a type of content featured by the promoter 106. For example, a promoter 106 having a personal weblog about home improvement may provide key words or phrases related to home improvement to the affiliate marketing platform 102, and the affiliate marketing platform 102 may return products related to home improvement that may be of interest to consumers 110 that visit the promoter's 106 personal weblog. In a further embodiment, the promoter 106 may provide access to the affiliate marketing platform 102 to search words and images in the promoter's 106 personal weblog or on a particular post within the weblog. In such an embodiment, the affiliate marketing platform 102 may provide personalized product suggestions that are related to the personal weblog or related to a particular post within the weblog. The promoter 106 may accept or deny any product suggestions to be featured on the website.

The promoter 106 may provide rules to the affiliate marketing platform 102 to indicate rankings for certain types of products. For example, the promoter 106 may provide filter rules indicating most relevant product categories, product ranks, product price ranges, and so forth. The promoter 106 may further elect to override any rules and instead provide any affiliate product on any page of the promoter's website or other media content.

In an embodiment, the system 100 operates within a website platform such as WordPress™, a weblog platform, and so forth. In an embodiment where the system 100 operates within WordPress™, the affiliate marketing platform 102 constitutes a plugin for assisting merchants 108 and promoters 106 in providing website content that includes affiliate marketing products.

In an embodiment, the system 100 is not impacted by advertisement blocking software in terms of affiliate product visualization on a web site even in cases where a user may add a custom script to produce an iFrame on the website. In this case, an affiliate product is not added directly to the HTML of the website (as is done with other types of advertisements) that may or may not be subject to advertising blocking software. The affiliate marketing platform 102 deploys affiliate products to the promoter 106 website in real time using intelligent deployment rules. The affiliate products are displayed when the promoter's website page loads every time, thus increasing the opportunity for click-through and conversion.

In an embodiment, the promoter 106 establishes an affiliate account with a merchant 108. The merchant 108 may provide login information such that the promoter 106 may access its affiliate account with the merchant to check the status of affiliate product click-throughs, and so forth that may impact the promoter's 106 compensation from the merchant 108. In such an embodiment, the affiliate marketing platform 102 may enable the promoter 106 to sign in to its affiliate account with the merchant 108 and to assign one or more product blocks to a particular affiliate account with a particular merchant 108. In such an embodiment, credits paid to the promoter 106 by the merchant 108 may be handled via the promoter's 106 personal affiliate account with the merchant 108 and will not be processed through the affiliate marketing platform 102.

Figure 2:
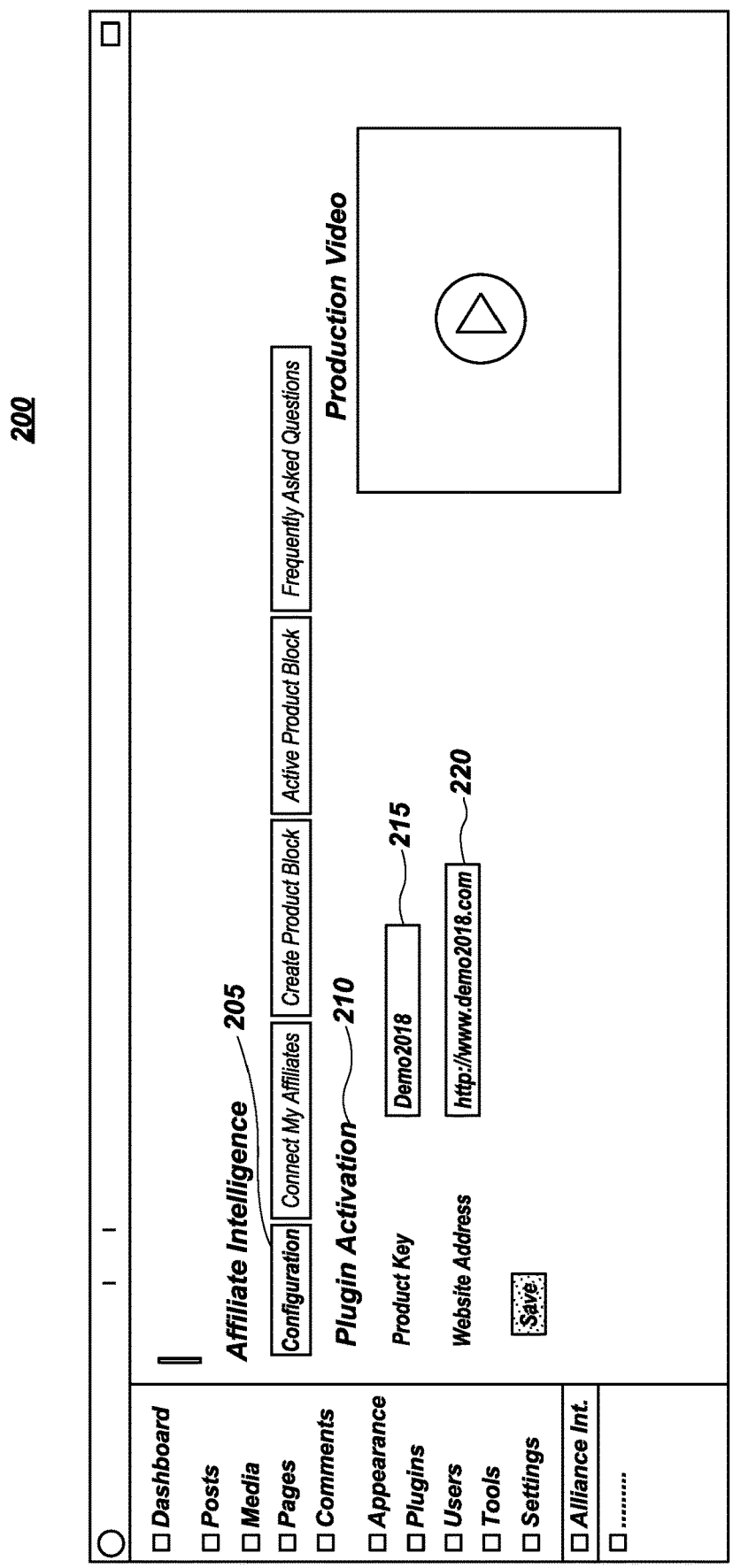
FIG. 2 illustrates a screen view of an affiliate marketing platform as seen by a promoter after selecting configuration in a menu under affiliate intelligence.

FIG. 2 illustrates a screen view 200 of an affiliate marketing platform 102 as seen by a promoter 106 after selecting configuration 205 in a menu under affiliate intelligence. The promoter 106 may activate a plugin 210 for the affiliate marketing platform 102. The plugin 210 may include a product key 215 and or a website address 220. Affiliate marketing platform 102 may integrate several affiliate accounts into a single platform through which a promoter 106 may apply global or individual changes to affiliate hyperlinks in a website for one or a plurality of affiliate accounts from a single platform.

Figure 3:
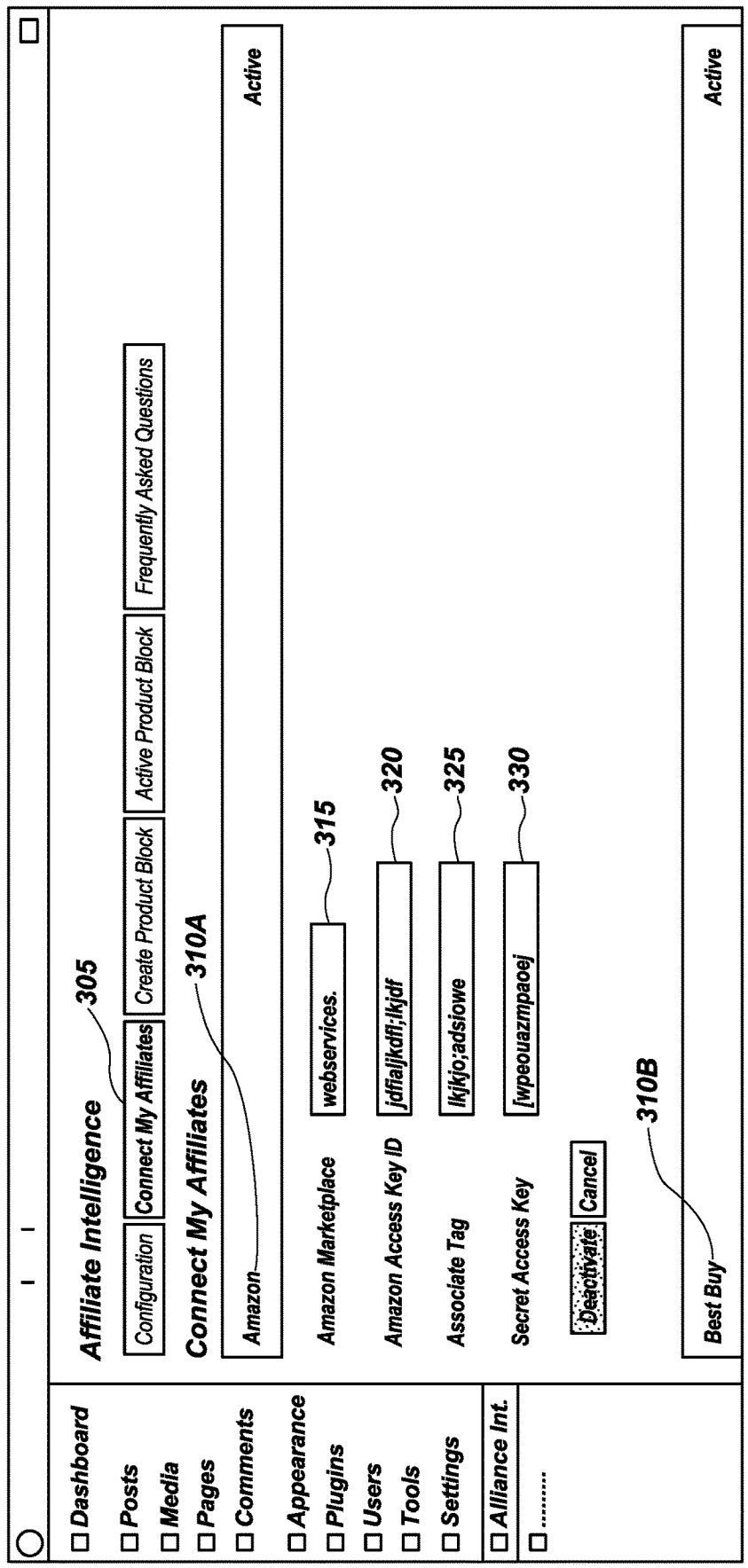
FIG. 3 illustrates a screen view of an affiliate marketing platform as seen by a promoter after selecting connect my affiliates in a menu under affiliate intelligence.

FIG. 3 illustrates a screen view 300 of an affiliate marketing platform 102 as seen by a promoter 106 after selecting connect my affiliates 305 in a menu under affiliate intelligence. As illustrated in FIG. 3, the promoter 106 may connect to affiliate services that the promoter 106 is already associated with. In an example, the promoter 106 may have an affiliate relationship with Best Buy 310B or Amazon 310A under a retailer such as Amazon Marketplace™, and the promoter 106 may sign into an affiliate account the affiliate website 315 within the affiliate marketing platform 102. The affiliate marketing platform 102 may request the promoter 106 to provide secure login information such as a key ID 320, an associate tag 325, and or a secret access key 330. As such, the affiliate marketing platform 102 may create a secure connection to the associate affiliate service and/or merchant 108. It is possible for multiple affiliate services to connect to the affiliate marketing platform 102 simultaneously. Also, Affiliate marketing platform 102 may integrate several affiliate accounts into a single platform through which a promoter 106 may apply global or individual changes to affiliate hyperlinks in a website for one or a plurality of affiliate accounts from a single platform. For example, a promoter 106 may "connect my affiliates" which may combine access to a plurality of retail websites, affiliate services, and allow a promoter 106 to apply a particular concerted strategy to specific content in a webpage that promotes products available through the retail website. For example, a promoter 106 may find that a particular product tends to "convert" (elicit more purchases of the product) than another product and may elect to apply a change to promote the particular product over another product, as will be discussed below.

Figure 4:
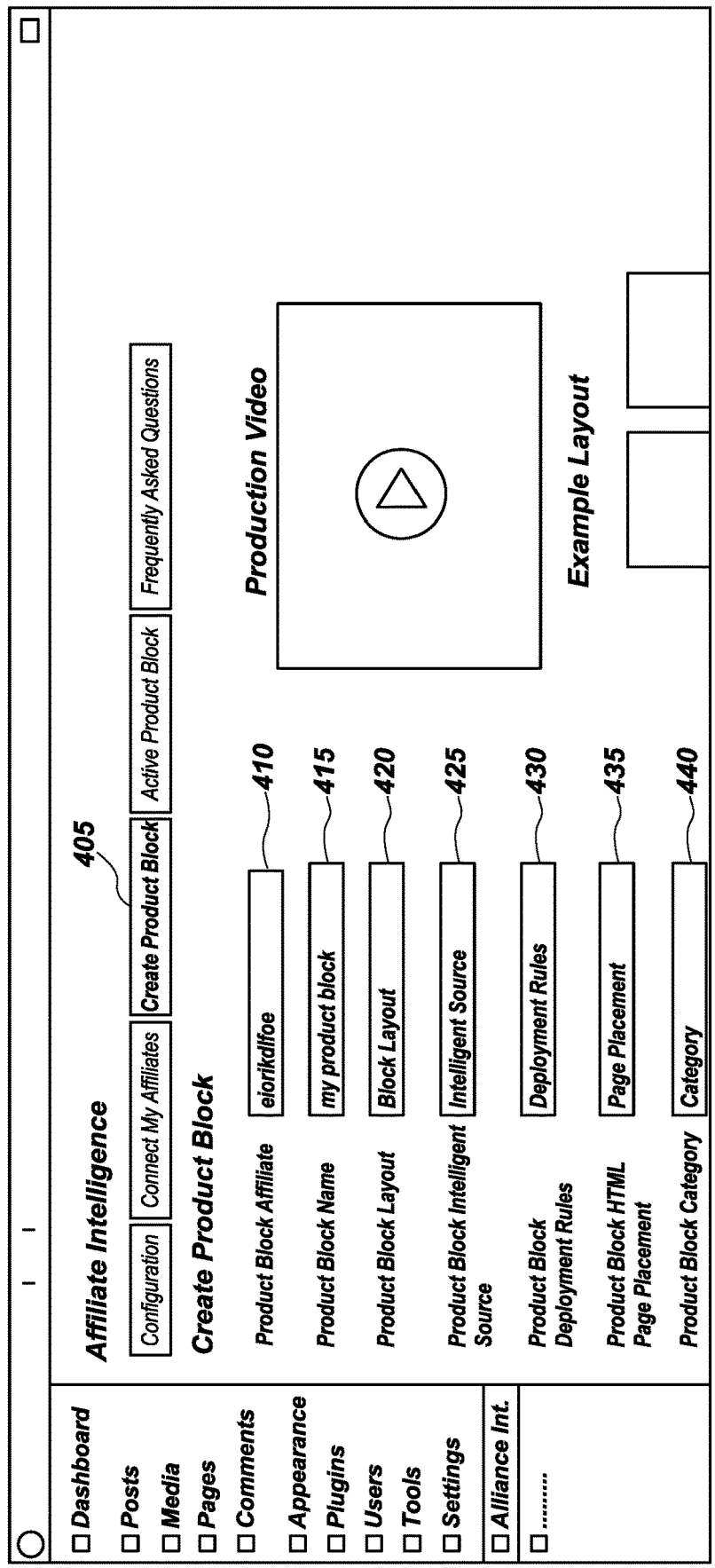
FIG. 4 illustrates a screen view of an affiliate marketing platform as seen by a promoter 106 after selecting create product block in a menu under affiliate intelligence.

FIG. 4 illustrates a screen view 400 of an affiliate marketing platform 102 as seen by a promoter 106 after selecting create product block 405 in a menu under affiliate intelligence. The product block 405 is a location within the promoter's website or other media content where affiliate products may be displayed. The product block 405 may be attributed to a certain affiliate service and/or merchant 108 by selecting a product block affiliate option 410, or the create product block 405 may be attributed to any affiliate service and/or merchant 108 as decided by the affiliate marketing platform 102. The promoter 106 may provide a name by selecting the product name option 415 and may select a layout for the product block (e.g., where an advertisement appears on the webpage with reference to the webpage content) at the product block layout option 420. Under create product block 405 the promoter 106 may select options for block intelligence source 425, product block deployment rules 430, product block HTML page placement 435, and affiliate product category 440.

Figure 5:
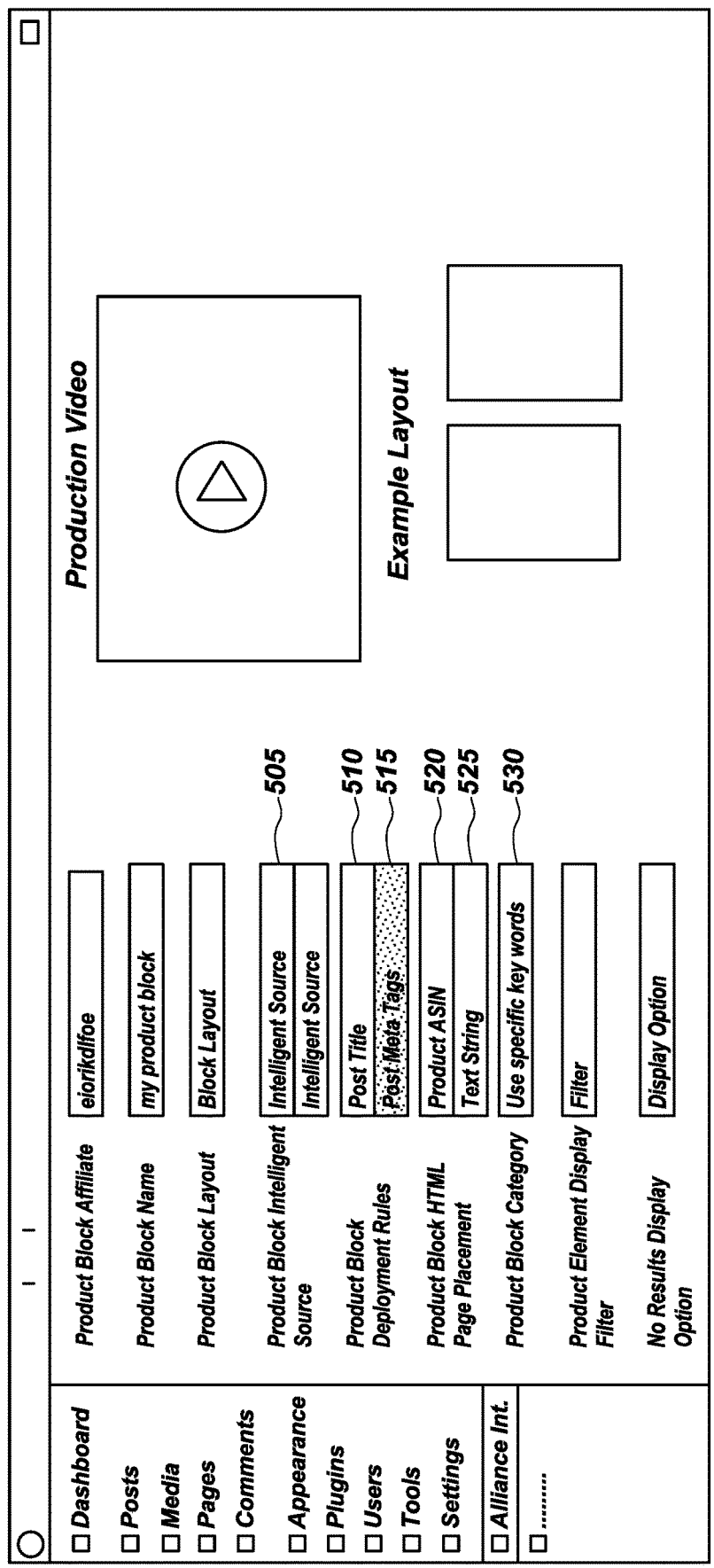
FIG. 5 illustrates a screen view of an affiliate marketing platform as seen by a promoter after selecting create product block in a menu under affiliate intelligence and then choosing select intelligent source.

FIG. 5 illustrates a screen view 500 of an affiliate marketing platform 102 as seen by a promoter 106 after selecting create product block in a menu under affiliate intelligence and then choosing select intelligent source 505. Examples of product block intelligence sources include, for example, post title 510, post meta tags 515, product ASIN 520, text string 525, specific keywords 530, and so forth. Affiliate marketing platform 102 may use product block intelligence sources to identify products that may be relevant to content in a webpage and include those products in the product blocks for advertising to users who visit a website with content provided by the promoter 106. Product block intelligence sources that use artificial intelligence may be utilized in connection with any internet connected device, including mobile devices (including laptop computers, smart phones, personal digital assistants, etc.), tablet devices, a desktop computer, or other devices disclosed herein. Providing access to product block intelligence sources via any internet connected device allows a user to make adjustments to the product block information at any time from any location. A further advantage of artificial intelligence based is the use of analytics associated with a conversion rate. In one embodiment, artificial intelligence may recognize a low interaction rate and a low conversion rate with a particular product that may be more appealing to the analytically significant customers. In another embodiment, artificial intelligence may select a different source of products or different products to display in a website advertisement based on the determination that visitors are from a particular country. In another embodiment, artificial intelligence may select a different source of products or a different product in which to advertise the particular product on the website, thus accommodating visitors to the website. The artificial intelligence selections of product sources, products, and times of day may be further directed by a user of affiliate marketing platform 102 and may occur in real time to provide maximum impact on interaction and conversion rates for a website. Product blocks may be updated at any time of day and for any reason based on a user's desires and intended results.

Figure 6:
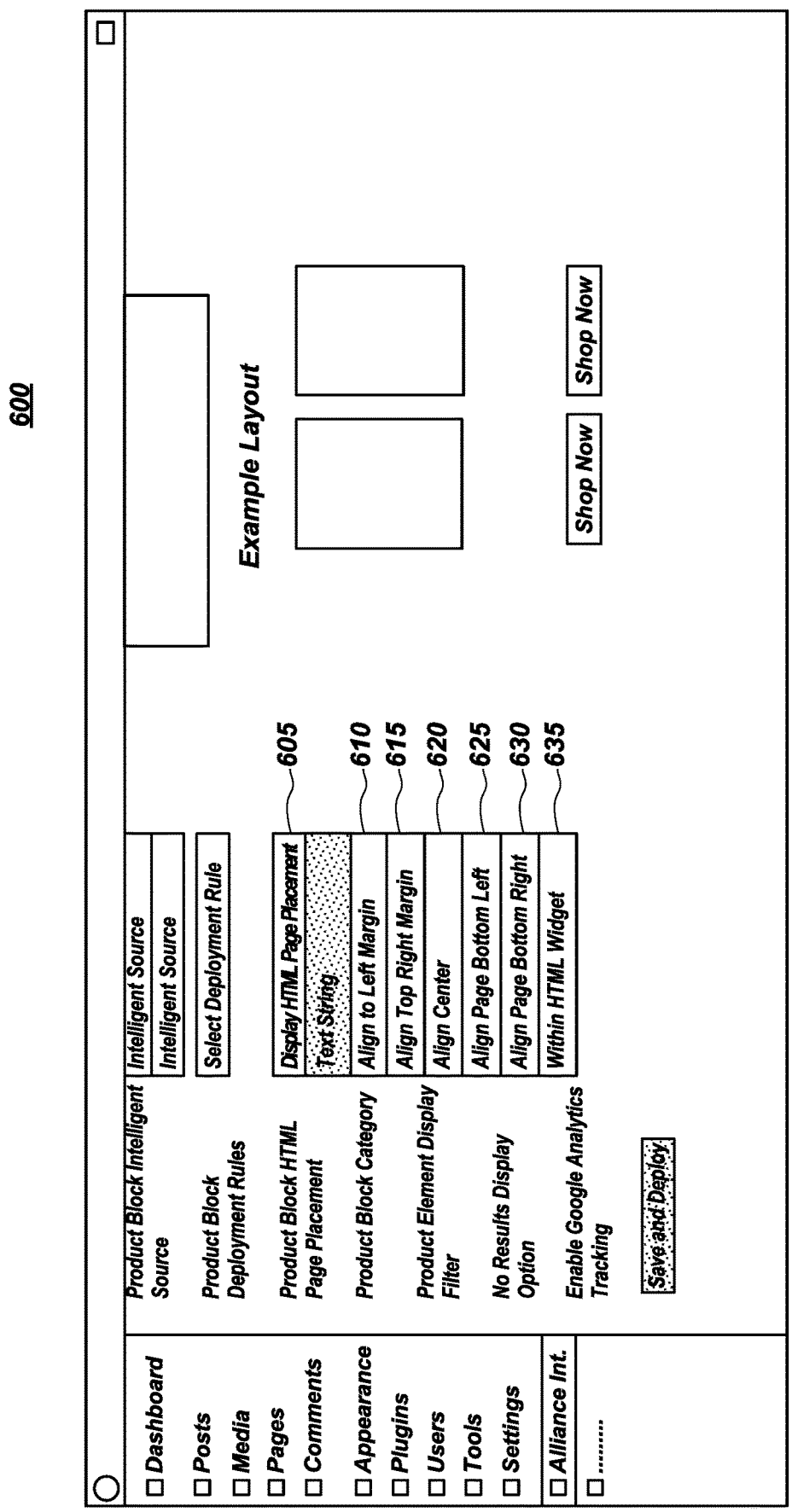
FIG. 6 illustrates a screen view of an affiliate marketing platform as seen by a promoter after selecting create product block in a menu under affiliate intelligence and then choosing select HTML page placement.

FIG. 6 illustrates a screen view 600 of an affiliate marketing platform 102 as seen by a promoter 106 after selecting create product block in a menu under affiliate intelligence and then choosing select HTML page placement 605. Examples of product block HTML page placement include, for example, direction to align at the top left margin 610, the top right margin 615, the center 620, the bottom left 625, and bottom right 630, and/or within a widget 635 on the promoter's 106 website or other media content.

Figure 7:
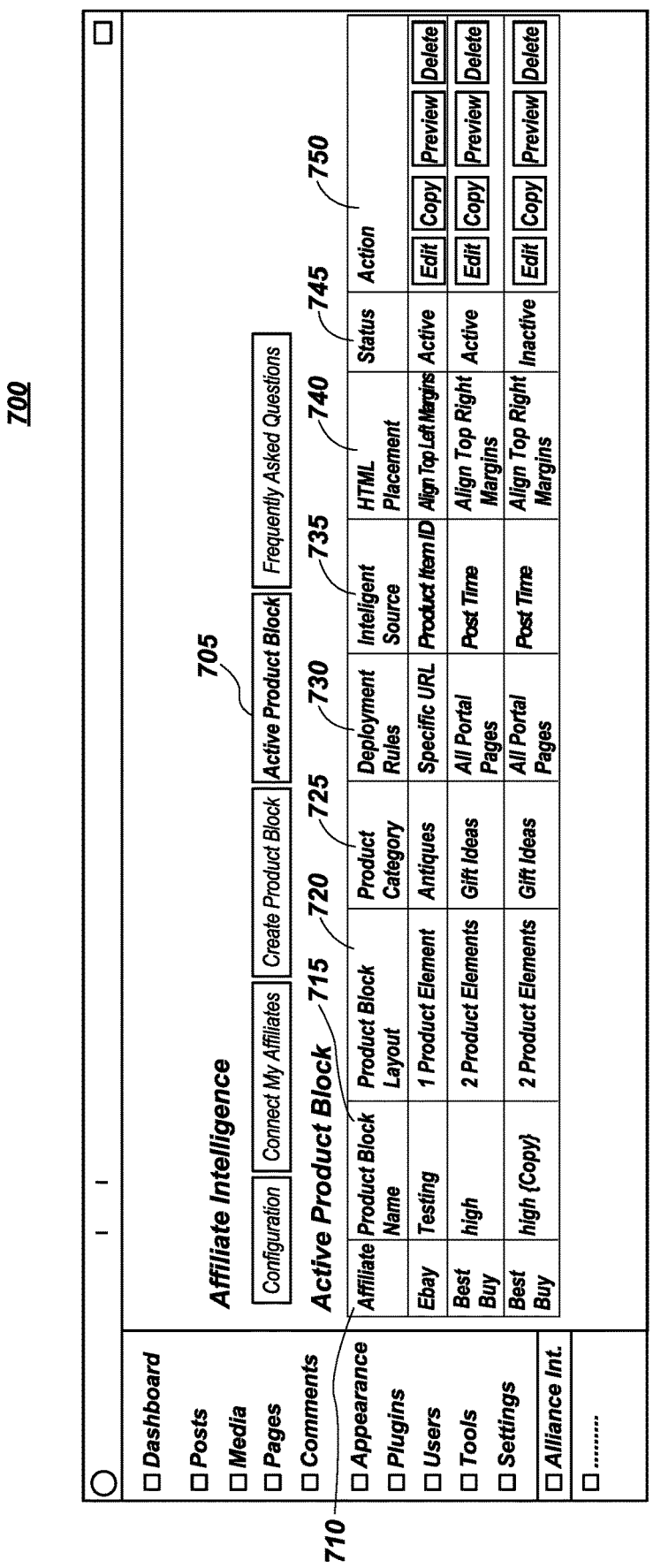
FIG. 7 illustrates a screen view of an affiliate marketing platform as seen by promoter 106 after selecting active production blocks.

FIG. 7 illustrates a screen view 700 of an affiliate marketing platform 102 as seen by promoter 106 after selecting active production blocks 705. In FIG. 7, the promoter 106 may view active product blocks within the promoter's website or other media content. The active product blocks may be associated with a particular affiliate 710. Each of the product blocks may be assigned a product block name 715 and a product block layout 720 to enable the promoter 106 to quickly distinguish between different product blocks. The product blocks may each be assigned a product category 725 to further enable the promoter 106 to distinguish between product blocks. Affiliate marketing platform 102 may display the deployment rule 730 and intelligence sources 735 for each of the product blocks. The screen view 700 of the active product block 705 includes a listing of HDML placement 740. Affiliate marketing platform 102 may also display which of the product blocks is in an active state or an inactive state 745. Further, affiliate marketing platform 102 may further provide options for an action 750 for editing, copying, previewing, and deleting one or more product blocks.

Figure 8:
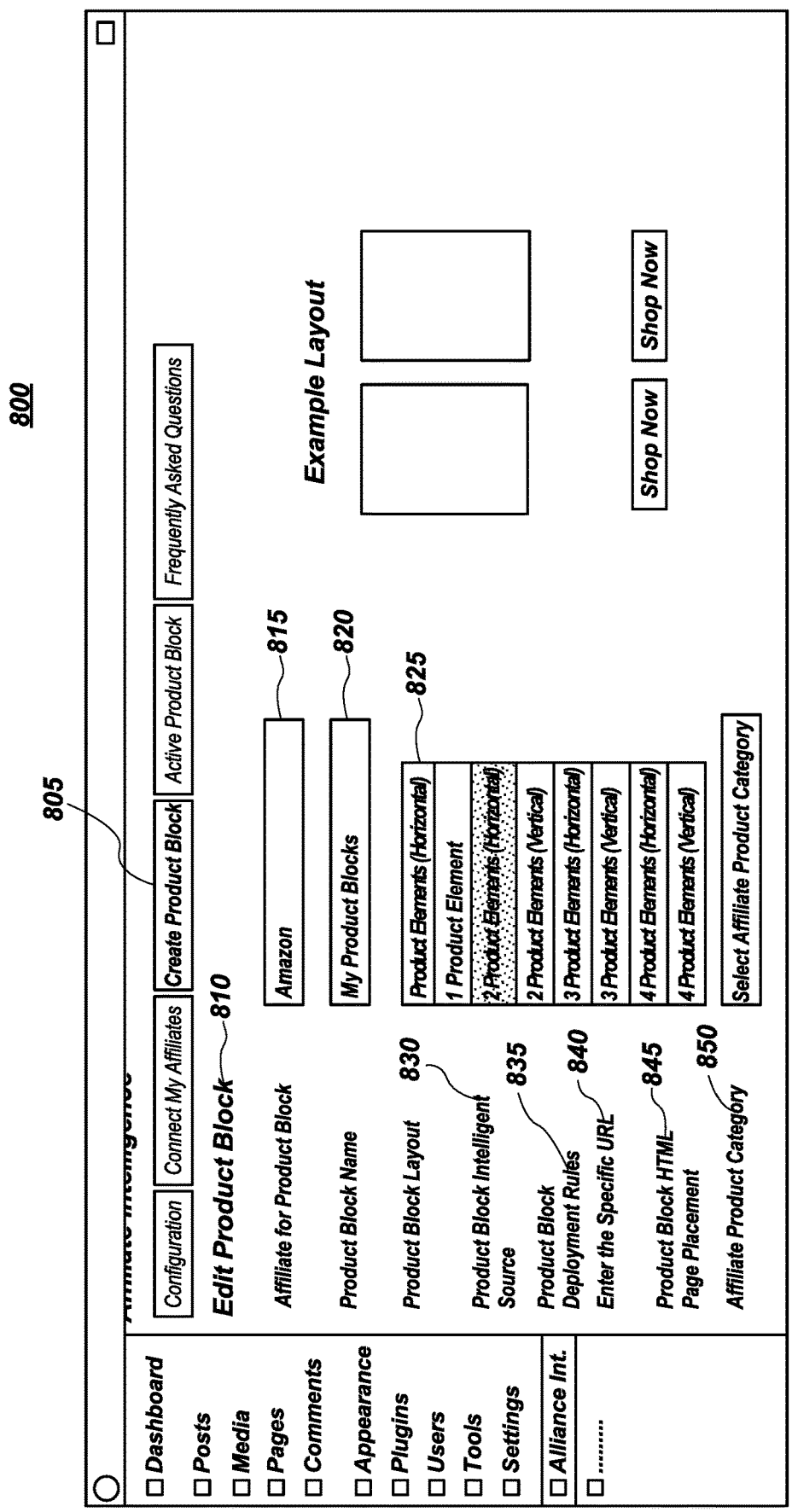
FIG. 8 illustrates a screen view of an affiliate marketing platform as seen by promoter after selecting active production blocks under editing product block.

FIG. 8 illustrates a screen view 800 of an affiliate marketing platform 102 as seen by promoter 106 after selecting active production blocks 805 under editing product block 810. As illustrated in FIG. 8 the promoter 106 may efficiently edit one or more product blocks. The promoter 106 may edit, for example, the affiliate for the product block 815, the product block name 820, the product block layout 825, the product block intelligence source 830, the product block deployment rules 835, the specific URL for the product block 840, the specific URL 840, the product block HTML page placement 845, the affiliate product category 850 for the product block.

Figure 9:
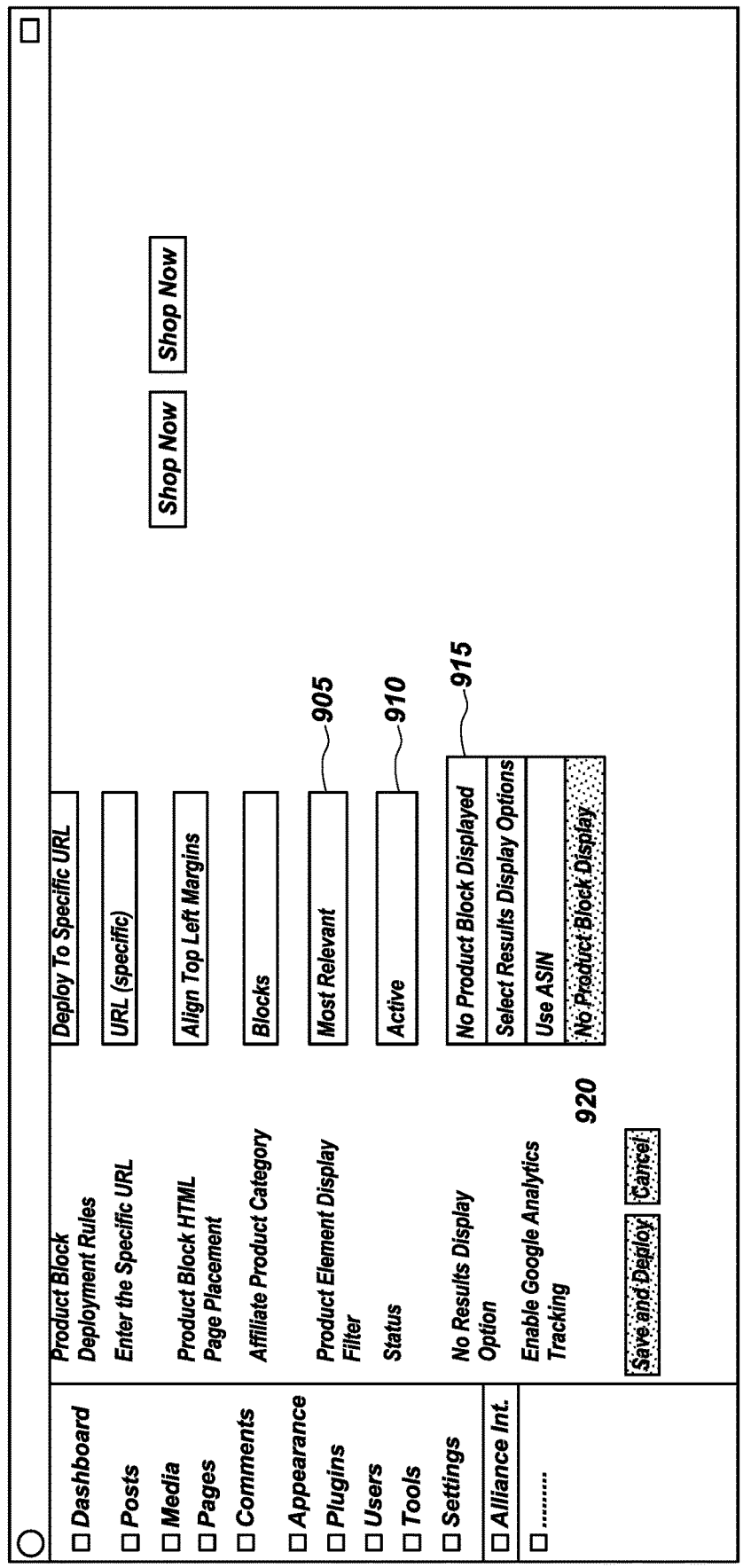
FIG. 9 illustrates scrolled down screen view of an affiliate marketing platform as seen by promoter after selecting active production blocks under editing product block.

FIG. 9 illustrates a scrolled down screen view 900 of an affiliate marketing platform 102 as seen by promoter 106 after selecting active production blocks 805 under editing product block 810. The screen view 900 includes options to edit a display filter 905 for the product element, an active/inactive status 910 for the product block, an indication of whether results display options 915 for the product block are displayed, and an whether to enable analytics such as Google analytics for tracking the product block. Affiliate marketing platform 102 may further link to analytic resources to identify product advertisements which are more frequently interacted with or which are more frequently purchased as a result of promotional content provided by promoter 106 on a webpage. Thus, affiliate marketing platform 102 may provide feedback for the relative success in terms of interaction, number of click-throughs, purchases, and/or total monetary value of various product blocks displayed in the website.

Figure 10:
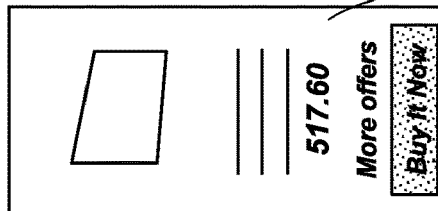
FIG. 10 illustrates a screen view of an example page of a promoter's website.

FIG. 10 illustrates a screen view of an example page of a promoter's website. The example website includes a product block 1002 on the left side of the website page. The product block 1005 displays an affiliate product and includes a "Buy it Now" button 1010 that enables a consumer 110 to click-through to read a description of product 1015 or recent posts 1020, and/or recent comments 1025, and/or purchase the affiliate product. In an instance where a consumer 110 clicks through to view the affiliate product, the affiliate marketing platform 102 will provide a notification of the click through to the appropriate merchant 108 or affiliate service.

Figure 11:
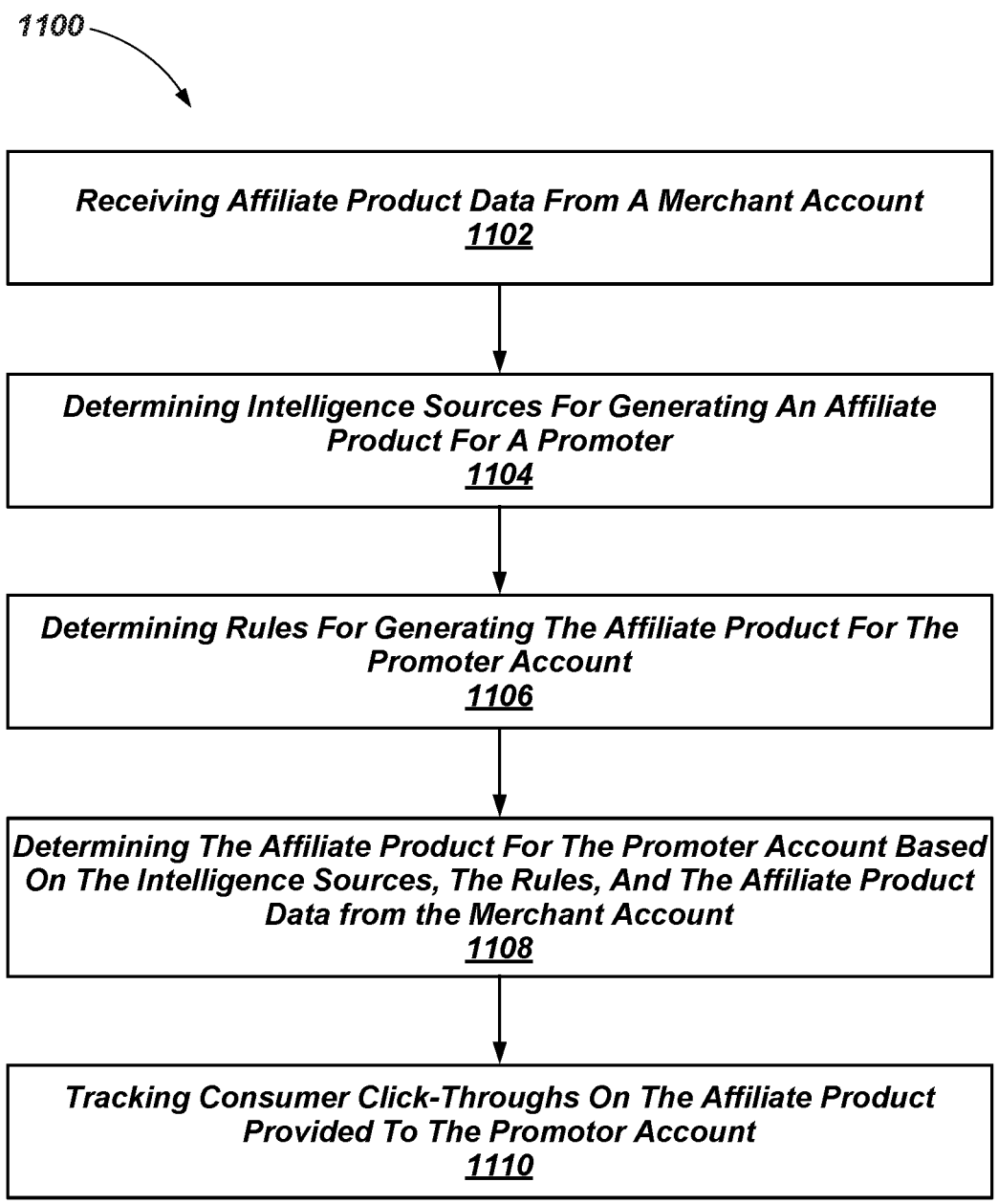
FIG. 11 is a schematic flow chart diagram of an example method of providing affiliate marketing to a promoter.

FIG. 11 is a schematic flow chart diagram of an example method 1100 of providing affiliate marketing to a promoter. The method 1100 may be completed by any suitable computing resource including an affiliate marketing platform 102. The method 1100 begins and the computing resource receives at 1102 affiliate product data from a merchant account. The computer resource determines at 1104 intelligence sources for generating an affiliate product for a promoter account. The computing resource determines at 1106 rules for generating the affiliate product for the promoter account. The computing resource determines at 1108 the affiliate product for the promoter account based on the intelligence sources, the rules, and the affiliate product data from the merchant account. The computing resource tracks at 1110 consumer click-throughs on the affiliate product provided to the promoter account.

Figure 12:
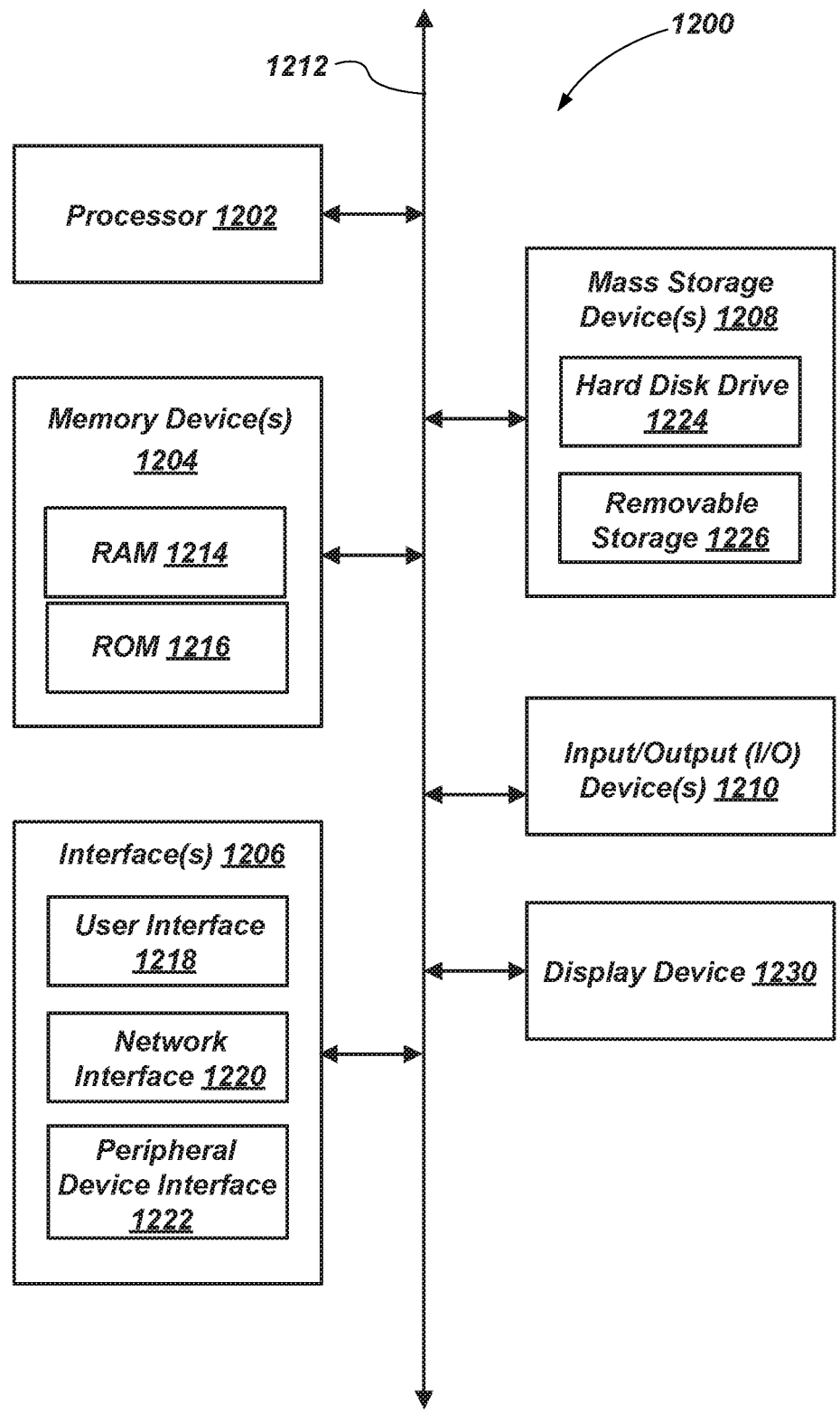
FIG. 12 illustrates block diagram of an example computing device is illustrated.

FIG. 12 illustrates block diagram of an example computing device 1200 is illustrated. Computing device 1200 may be used to perform various procedures, such as those discussed herein. In one embodiment, the computing device 1200 may be implemented as a device associated with promoter 106, a consumer 110, a merchant 108, or an affiliate marketing platform 102. Computing device 1200 can perform various monitoring functions as discussed herein, and can execute one or more application programs, such as the application programs or functionality described herein. Computing device 1200 can be any of a wide variety of computing devices, such as a desktop computer, in-dash computer, vehicle control system, a notebook computer, a server computer, a handheld computer, tablet computer, smart television, and the like.

Computing device 1200 includes one or more processor(s) 1202, one or more memory device(s) 904, one or more interface(s) 1206, one or more mass storage device(s) 1208, one or more Input/output (I/O) device(s) 1210, and a display device 1230 all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 1, a particular mass storage device is a hard disk drive 1224. Various drives may also be included in mass storage device(s) 1208 to enable reading from and/or writing to the various computer readable media. Mass storage device(s) 1208 include removable media 1226 and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, wireless or wired remote control devices, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 may include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more user interface elements 1218. The interface(s) 1206 may also include one or more peripheral interfaces such as interfaces for printers, pointing devices (mice, track pad, or any suitable user interface now known to those of ordinary skill in the field, or later discovered), keyboards, and the like.

Bus 1212 allows processor(s) 1202, memory device(s) 1204, interface(s) 1206, mass storage device(s) 1208, and I/O device(s) 1210 to communicate with one another, as well as other devices or components coupled to bus 1212. Bus 1212 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1200 and are executed by processor(s) 1202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method of providing dynamic affiliate marketing. The method includes receiving affiliate product data from a merchant account. The method includes determining intelligence sources for generating an affiliate product for a promoter account and determining rules for generating the affiliate product for the promoter account. The method includes determining the affiliate product for the promoter account based on the intelligence sources, the rules, and the affiliate product data from the merchant account. The method includes tracking consumer click-throughs on the affiliate product provided to the promoter account.

Example 2 is a method as in Example 1, further including generating a product block for the promoter account, wherein the product block dynamically features an affiliate product.

Example 3 is a method as in any of Examples 1-2, further including receiving an indication from the promoter to securely sync with a merchant or affiliate service.

Example 4 is a method as in any of Examples 1-3, further including providing an indication of the consumer click-throughs on the affiliate product to the merchant account.

Example 5 is a method as in any of Examples 1-4, wherein the intelligence sources include one or more of a post title, a post meta tag, a product ASIN, a test string, or a specific keyword.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, televisions, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A non-transitory computer readable storage medium containing instructions which when executed by a processor cause the processor to perform a method, the method comprising:
receiving product data from a merchant account;
determining intelligence sources for generating a plurality of products represented in the product data for a promoter account;
determining one or more rules for selecting one or more of the generated plurality of products for the promoter account;
determining, by the processor, the one or more products for the promoter account based on the rules, the determined intelligence sources, and the generated plurality of products;
providing, to the promoter account, data representative of the one or more products determined by the processor for display on a webpage associated with the promoter account;
sending, to the promoter account, a hyperlink of one or more of the determined products for acceptance by a promoter using the promoter account;
tracking, based on the hyperlink, consumer click-throughs on the display on the webpage of the data representative of the one or more products provided to the promoter account.

2. The non-transitory computer readable storage medium of claim 1, the method further comprising:
generating one or more product blocks to display the one or more products.

3. The non-transitory computer readable storage medium of claim 2, the method further comprising:
displaying the one or more product blocks each time the webpage loads.

4. The non-transitory computer readable storage medium of claim 2, the method further comprising:
customizing where on the webpage the one or more product blocks are placed.

5. The non-transitory computer readable storage medium of claim 4, the method further comprising:
integrating a plurality of merchant accounts into an interface associated with the promoter account.

6. The non-transitory computer readable storage medium of claim 2, the method further comprising:
receiving, by the promotor, product information concerning one or more products from a plurality of merchant accounts.

7. The non-transitory computer readable storage medium of claim 6, wherein changes to the one or more product blocks of a single merchant account are applied globally to all merchant account or individually to a single merchant from an interface associated with the promoter account.

8. The non-transitory computer readable storage medium of claim 1, the method further comprising:
identifying one of the one or more products to be placed on the webpage associated with the promoter account based on webpage content.

9. The non-transitory computer readable storage medium of claim 1, the method further comprising:
receiving an indication from the promoter account to securely sync with a merchant account.

10. The non-transitory computer readable storage medium of claim 1, the method further comprising:
providing, via a display, an indication of the consumer click-throughs for the one or more products to the merchant account.

11. The non-transitory computer readable storage medium of claim 1, wherein the intelligence sources include one or more of a post title, a post meta tag, a product ASIN, a test string, or a specific keyword.

12. The non-transitory computer readable storage medium of claim 1, wherein the one or more product blocks dynamically feature the one or more products for which data representative of the one or more products is provided for display on the webpage associated with the promoter account.

13. A system comprising:
a processor to:
determine intelligence sources for generating one or more products for a promoter platform;
receive product information data from a merchant processor;
determine rules for generating the one or more products for the promoter platform;
determine, by the processor, the one or more products for the promoter platform based on the intelligence source, the rules, and the one or more products data from a merchant processor;
provide the promoter platform the one or more products determined from the merchant processor;
send, to the promoter platform, a hyperlink of one or more of the determined products for acceptance by a promoter associated with a promoter account;
receive information regarding consumer click-throughs on the one or more products;
track consumer click-throughs on the one or more products provided to the promoter platform; and
provide click-through information to the promoter platform.

14. The system of claim 13, wherein the processor further:
determines rules for generating one or more product for display on a webpage associated with the promoter account.

15. The system of claim 13, wherein the processor further:
generates a product block on a webpage associated with the promoter account in a location that is based on obtaining a click-through response.

16. The system of claim 15, wherein the product block is generated based on the intelligence sources which identify the one or more products.

17. The system of claim 16, wherein the intelligence sources include content on the webpage associated with the promoter account.

18. The system of claim 16, wherein the product block dynamically features the one or more products on the webpage associated with the promoter account.

19. The system of claim 18, wherein dynamically featuring one or more products on the webpage associated with the promoter account includes dynamically featuring the one or more products globally on every webpage associated with the promoter account or dynamically featuring the one or more products on an individual webpage associated with the promoter account.

20. The system of claim 13, wherein the processor further:
   customer click-through information based on a location of the product block on the webpage associated with the promoter account.

\* \* \* \* \*